Figure 1:
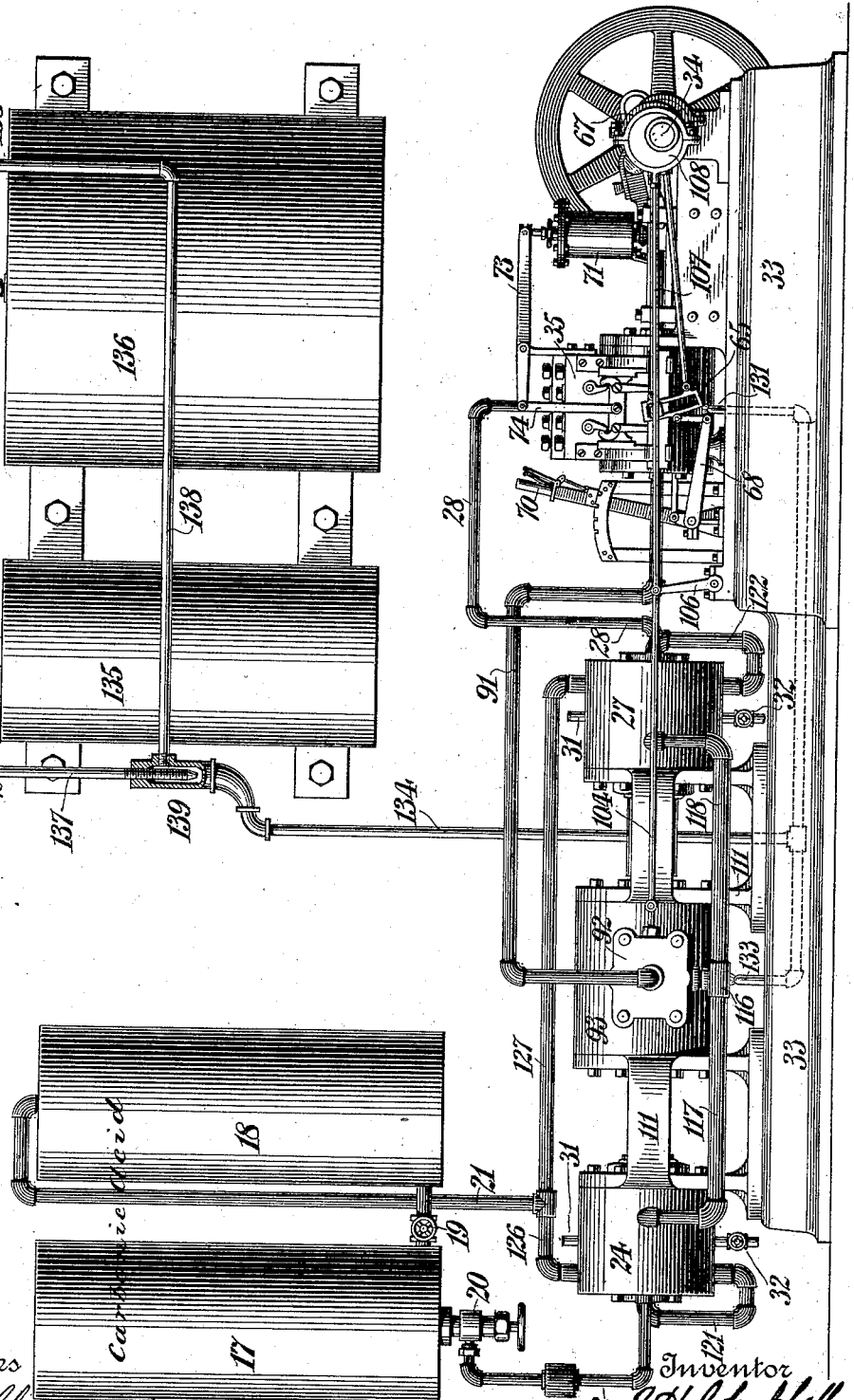

(No Model.) 9 Sheets—Sheet 1.

G. H. CHAPPELL.
APPARATUS FOR USING GASES UNDER HIGH PRESSURE FOR POWER.

No. 505,028. Patented Sept. 12, 1893.

Witnesses
C. E. Ashley
H. W. Lloyd.

Inventor
G. H. Chappell
By his Attorneys
Baldwin, Davidson & Wight (No Model.)

9 Sheets—Sheet 3.

G. H. CHAPPELL.
APPARATUS FOR USING GASES UNDER HIGH PRESSURE FOR POWER.

No. 505,028. Patented Sept. 12, 1893.

Witnesses
C. E. Ashley
H. W. Lloyd.

Inventor
G. H. Chappell
By his Attorneys
Baldwin, Davidson & Wight

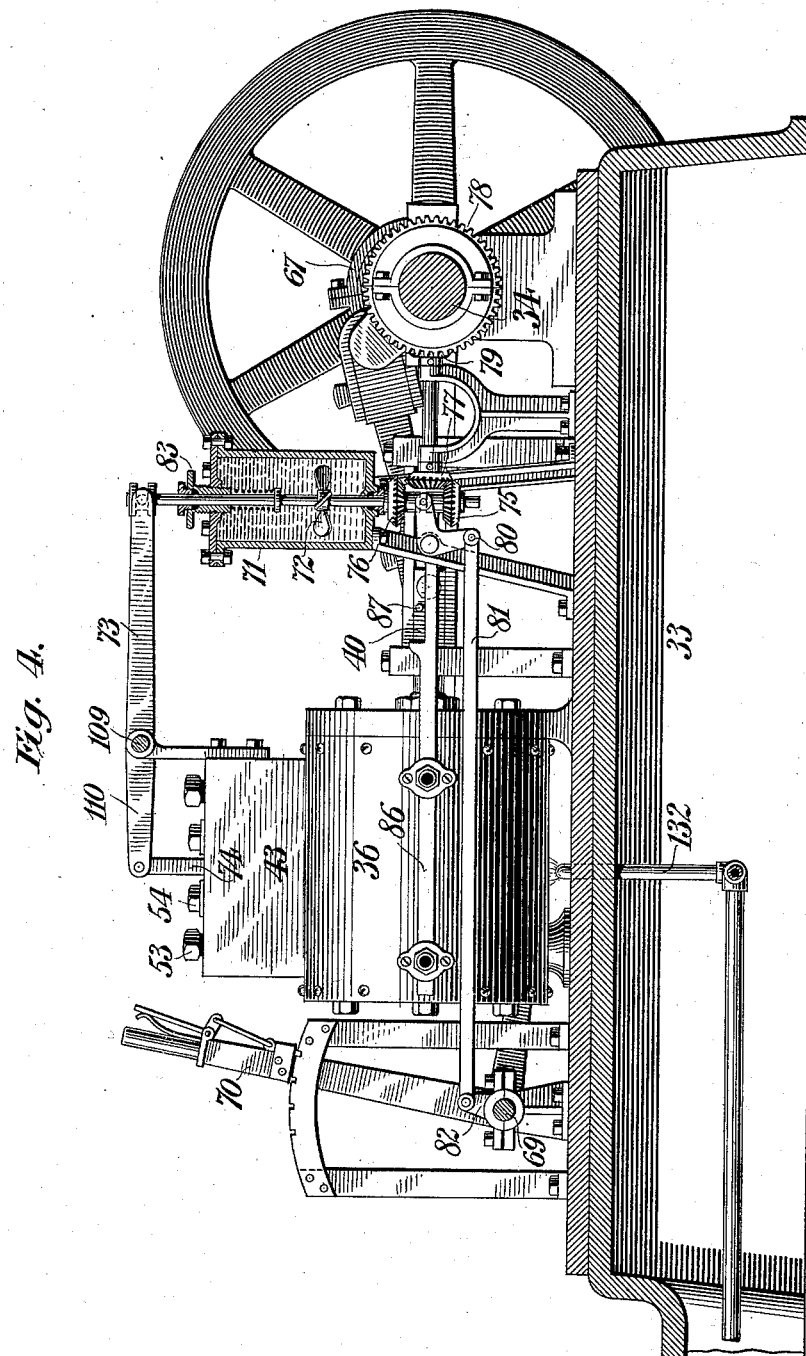

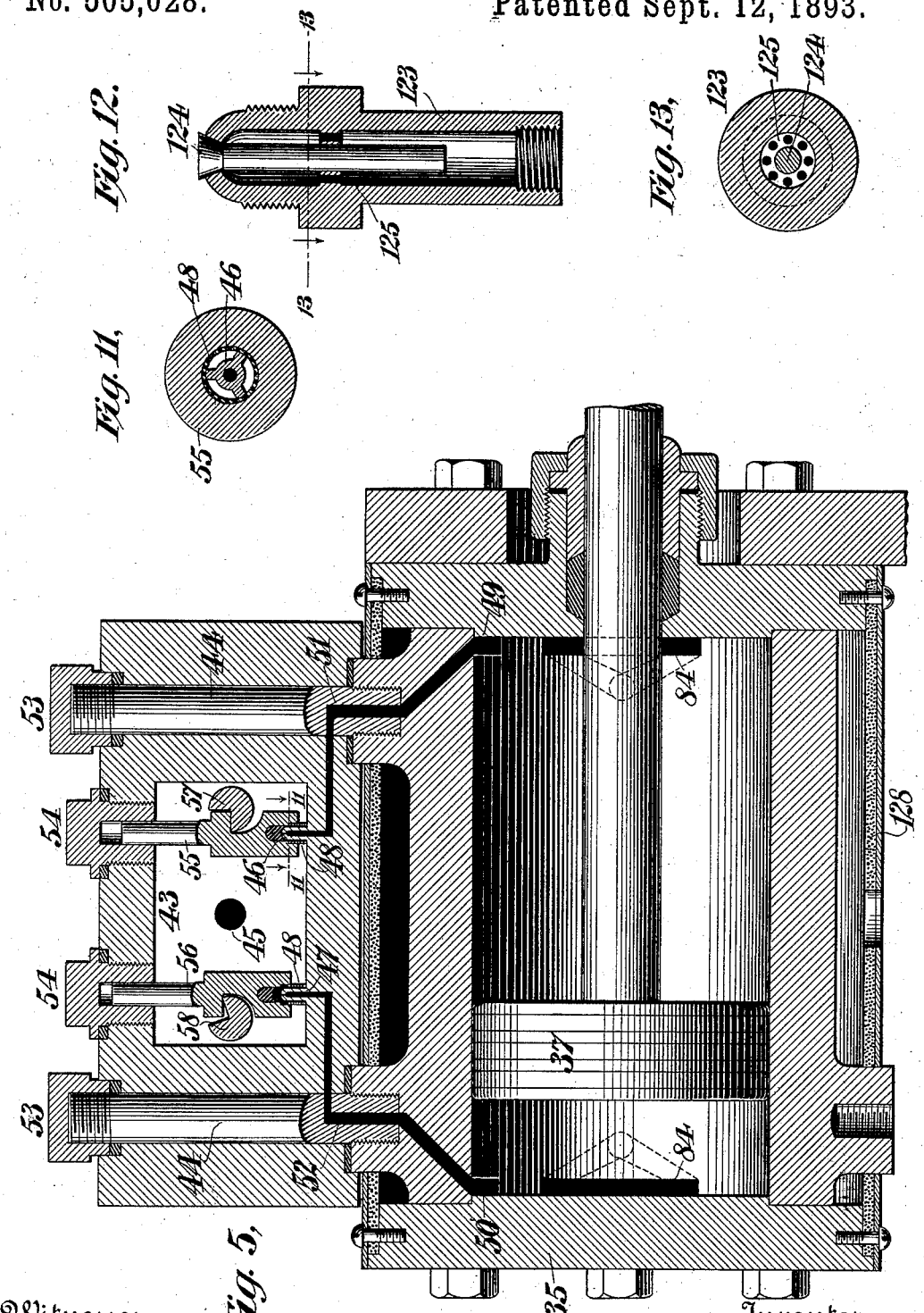

(No Model.) 9 Sheets—Sheet 6.
G. H. CHAPPELL.
APPARATUS FOR USING GASES UNDER HIGH PRESSURE FOR POWER.
No. 505,028. Patented Sept. 12, 1893.
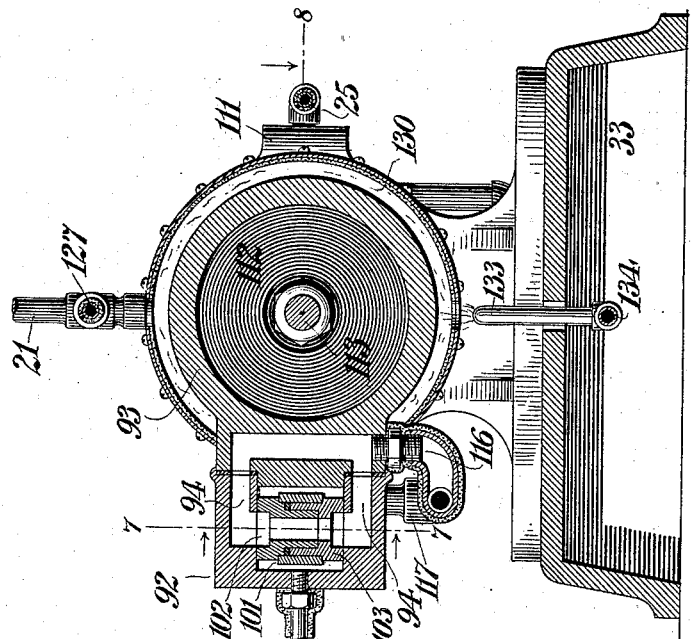
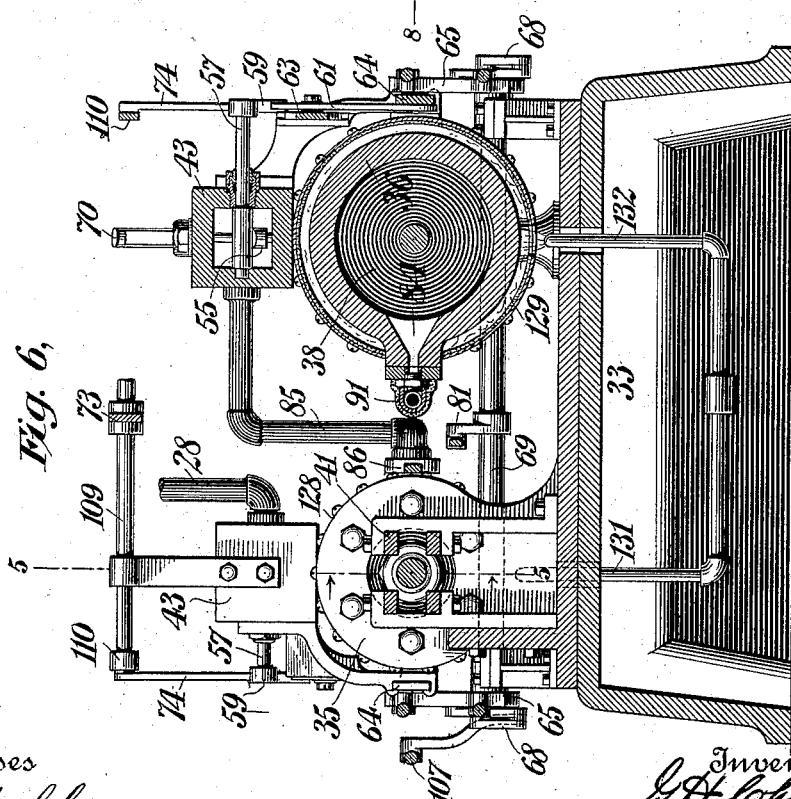

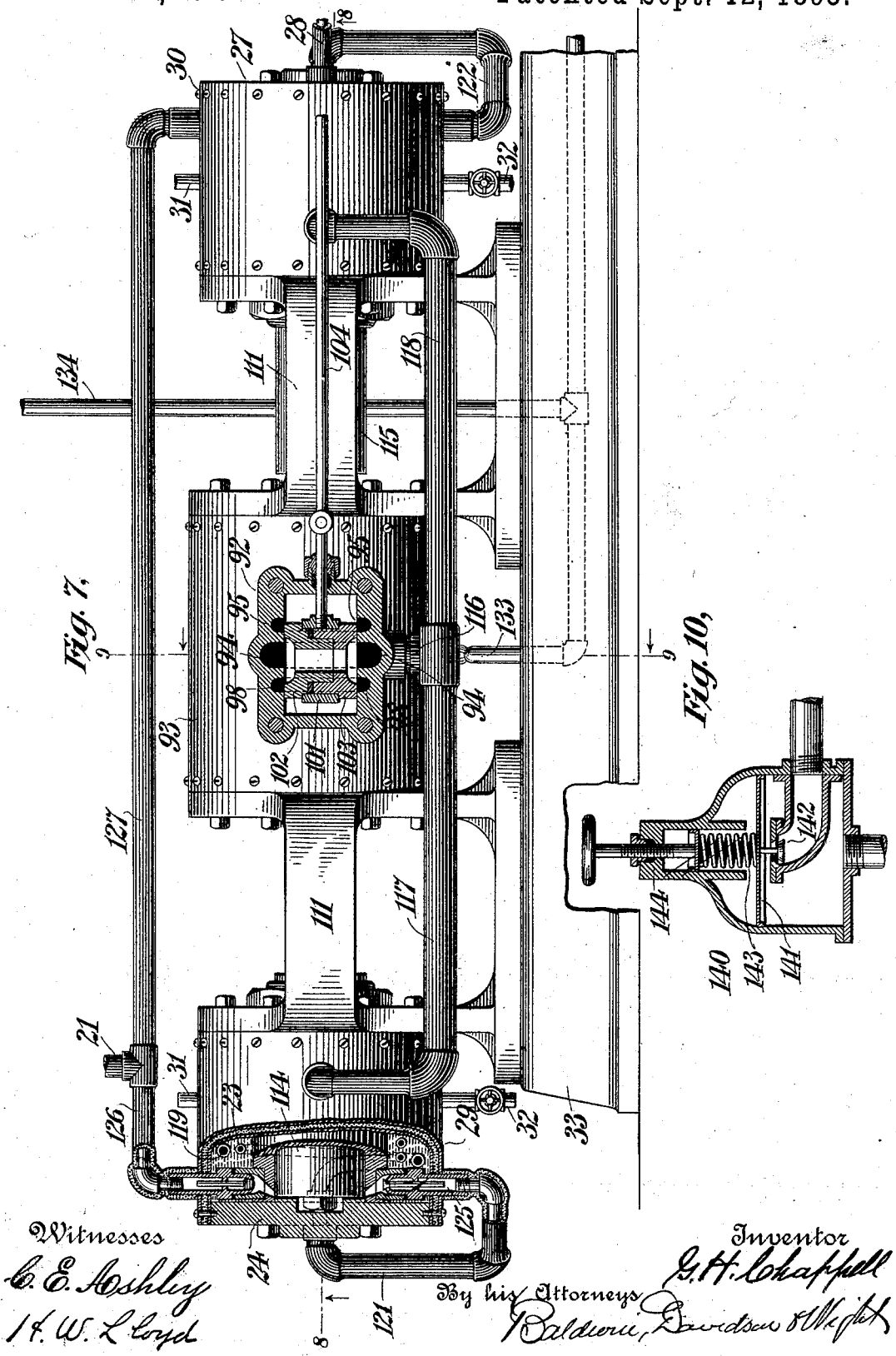

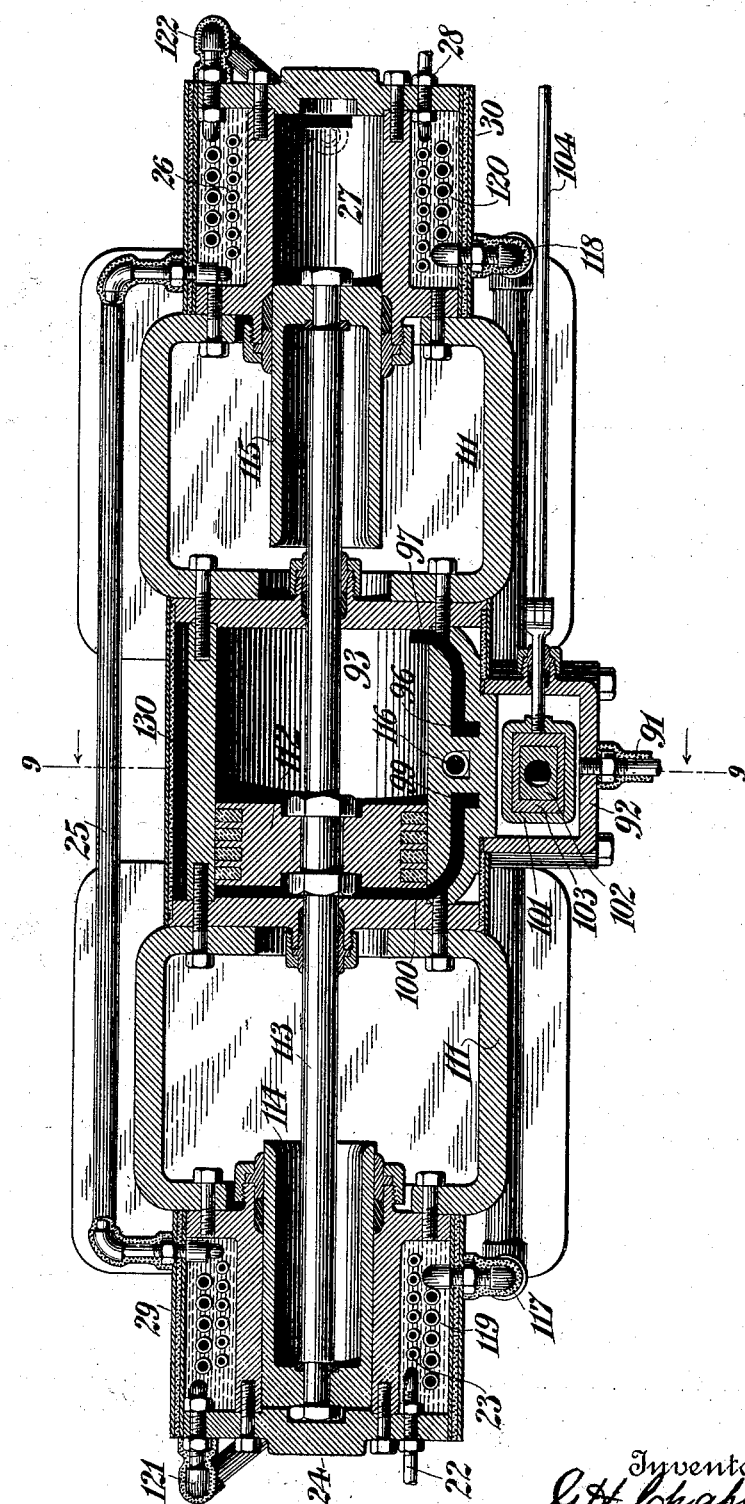

(No Model.) 9 Sheets—Sheet 9.
G. H. CHAPPELL.
APPARATUS FOR USING GASES UNDER HIGH PRESSURE FOR POWER.
No. 505,028. Patented Sept. 12, 1893.
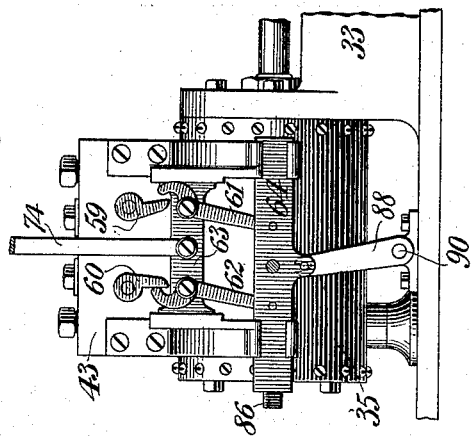
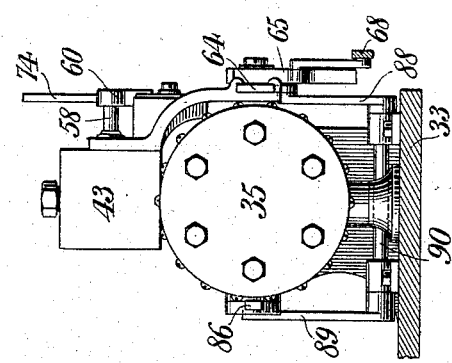
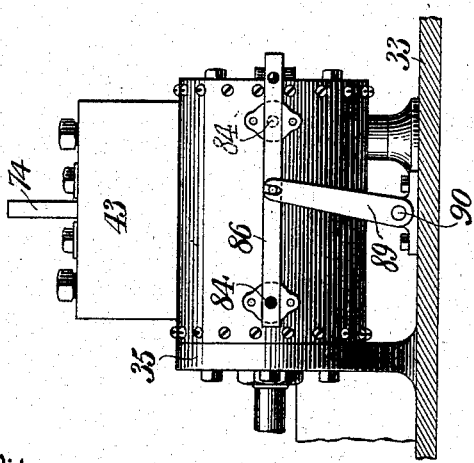

UNITED STATES PATENT OFFICE.

GEORGE H. CHAPPELL, OF NEW YORK, N. Y., ASSIGNOR TO THE NEW POWER COMPANY, OF SAME PLACE.

APPARATUS FOR USING GASES UNDER HIGH PRESSURE FOR POWER.

SPECIFICATION forming part of Letters Patent No. 505,028, dated September 12, 1893.

Application filed September 26, 1892. Serial No. 446,906. (No model.)

*To all whom it may concern:*

Be it known that I, GEORGE H. CHAPPELL, a citizen of the United States, residing at New York city, in the county and State of New York, have invented certain new and useful Improvements in Apparatus for Using Gases Under High Pressure for Power, of which the following is a specification.

The method of using compressed gas, shown in this invention contemplates a closed circuit system in a part of which a suitable gas, preferably carbonic acid gas, is initially compressed to a liquid; this is then gradually allowed to partly expand and so abstract heat from a suitable fluid, as water; from this point of its circuit it passes to a motor, further expands and with the added energy of extraneous heat actuates said motor; then after thus giving up some of its stored energy it passes to and actuates the power applying element of a gas compressor being assisted in such work by extraneous heat. Then from said power part of the compressor it passes in its circuit under the influence of the cooling action of the fluid which was reduced in temperature by its first expansion, thereby having its pressure reduced when it is submitted to the compressing action of the compressor, being still under the influence of the cooled fluid, from which it passes to its original point of departure in the circuit, thus completing the cycle.

My invention relates to the apparatus for the practical application of this method and comprises first, means for the initial storage of the carbonic acid under a high pressure; secondly, a condensing or heat imparting and absorbing device; thirdly, a motor engine constructed to be actuated by the partial expansion of the carbonic acid and from which power for any desired purpose may be taken; fourthly, compressed air and compressed heating gas reservoirs, and burners connected therewith for externally heating the expansion cylinders of the motor engine, and thereby add to the energy of the expanding carbonic acid; fifthly, a gas compressing engine provided with a cylinder and piston, which by means of pipe connections with the eduction ports of the motor engine is actuated by the remaining energy of the carbonic acid, said cylinder also being adapted to receive heat from some of the burners of the heating apparatus, and compressing cylinders and pistons, which are surrounded by the heat imparting and absorbing device and by means of which the carbonic acid gas, after actuating the engine, is cooled and compressed and returned to the storage reservoirs.

The means for storing the carbonic acid under pressure consists of two drums or reservoirs connected together at their lower ends, with a valve between them so that their contents may be joined or separated as desired. One of these drums has an outlet at its lower end from which the highly compressed or fluid carbonic acid is allowed to flow in starting on its course through the apparatus, the rate of flow being goverened by a valve, the pipe from said valve being connected to the heat imparting and absorbing device. The other drum forms the termination of the circuit and is connected at its upper end to the discharge outlets of the gas compressing cylinders.

The means for imparting heat to the compressed carbonic acid as it leaves the storage reservoir thereby allowing it to partly expand consists of a fluid as water or brine, held in jacketed chambers around the gas compressing cylinders, and a coil or coils of pipe located in the fluid and through which the carbonic acid flows and is initially partly expanded, the brine thereby being greatly reduced in temperature and in condition to readily absorb heat from the carbonic acid in its finally expanded condition, to assist the compression pumps in reducing it to a highly condensed or fluid condition, said expanded carbonic acid, before passing into the compression pumps, being caused to flow through a coil or series of pipes located in the water or brine.

The motor engine, which is of the reciprocal type, embraces many novel features of construction, designed to specially adapt this class of engines to be actuated by a gas or gases under a high state of compression. This is shown as adapted to utilize the compressed gas by double expansion, the general features of construction of the two cylinders and their attending mechanism being the same. The induction valves are, by reason of the enormous energy locked up in the actuating medium, comparatively small, but small quantities of said medium being required for each charge. These valves are constructed on the puppet valve principle and are provided with fine mesh screens to prevent the admission to them of any dirt or dust that may be in the compressed gas. They are operated by suitable adjustable mechanism connected to eccentric rods, from eccentrics on the crank shaft, and reversing gear. The valve chest of the first or high pressure cylinder is connected to the expansion coil of the heat imparting device, and the eduction valves of this cylinder are in communication with the valve chest of the second or low pressure cylinder, and so on, if more than two cylinders be used.

The cylinders of this engine are provided with casings having an inclosed space surrounding them, in which space is burned a gas issuing from blow pipe burners, the heat due to such combustion acting on the carbonic acid, while in said cylinders, adds to its expansion and thereby increases its energy. The governing device driven from the crank shaft is by a simple application of movable bevel gears caused to maintain its given direction of rotation when the engine is reversed. The eduction valves are by means of a simple rock shaft and arms connected to the operating mechanism of the induction valves and caused thereby to work in unison therewith.

The next part of the apparatus is the gas compressing engine. This consists of a cylinder and piston of ordinary construction provided with a slide valve of peculiar construction, by which the gas enters and leaves the cylinder from both sides of the valve, said valve being entirely surrounded by the gas and perfectly balanced. This valve is connected to and operated by an eccentric rod, whose eccentric is carried by the crank shaft of the motor engine, so that said pump engine is caused to work in time with the motor engine, its valve chest being connected by a pipe to the eduction ports of the last cylinder of the motor engine. The pump engine cylinder is provided with a casing and is heated by means of a gas burner whose source of supply is the same as that of the motor engine burners. The gas compressing cylinders, of which there are two in line with the power cylinder, are as before stated surrounded by water or brine which is much reduced in temperature by the initial expansion of the compressed carbonic acid. The gas, after performing its work in the power cylinder passes from the eduction or exhaust port to coils of pipe located in the cold water or brine surrounding the compression cylinders, and after having a considerable amount of its heat thereby extracted is drawn into the compression cylinders and therein condensed and forced through the outlet passages to the receiving reservoir, in condition to again pass through the closed circuit and perform the described cycle of actions. The heat producing apparatus embraces a drum or reservoir provided with a supply of air under pressure and another one supplied with a suitable burning gas also under pressure. The discharge pipes of these reservoirs are provided with pressure regulating devices from which the gas and air passes to a mixing chamber, and from said chamber, thoroughly commingled, they pass by means of branch pipes to the various burners under the power cylinders of the motor and compression engine. These with other novel features in the construction of the various parts of the apparatus will now be fully described by reference to the accompanying drawings which represent an organization embodying the principles of construction of my invention, and well adapted for the carrying out of the new method of using carbonic acid or other gas under pressure involved in my invention.

Figure 2:
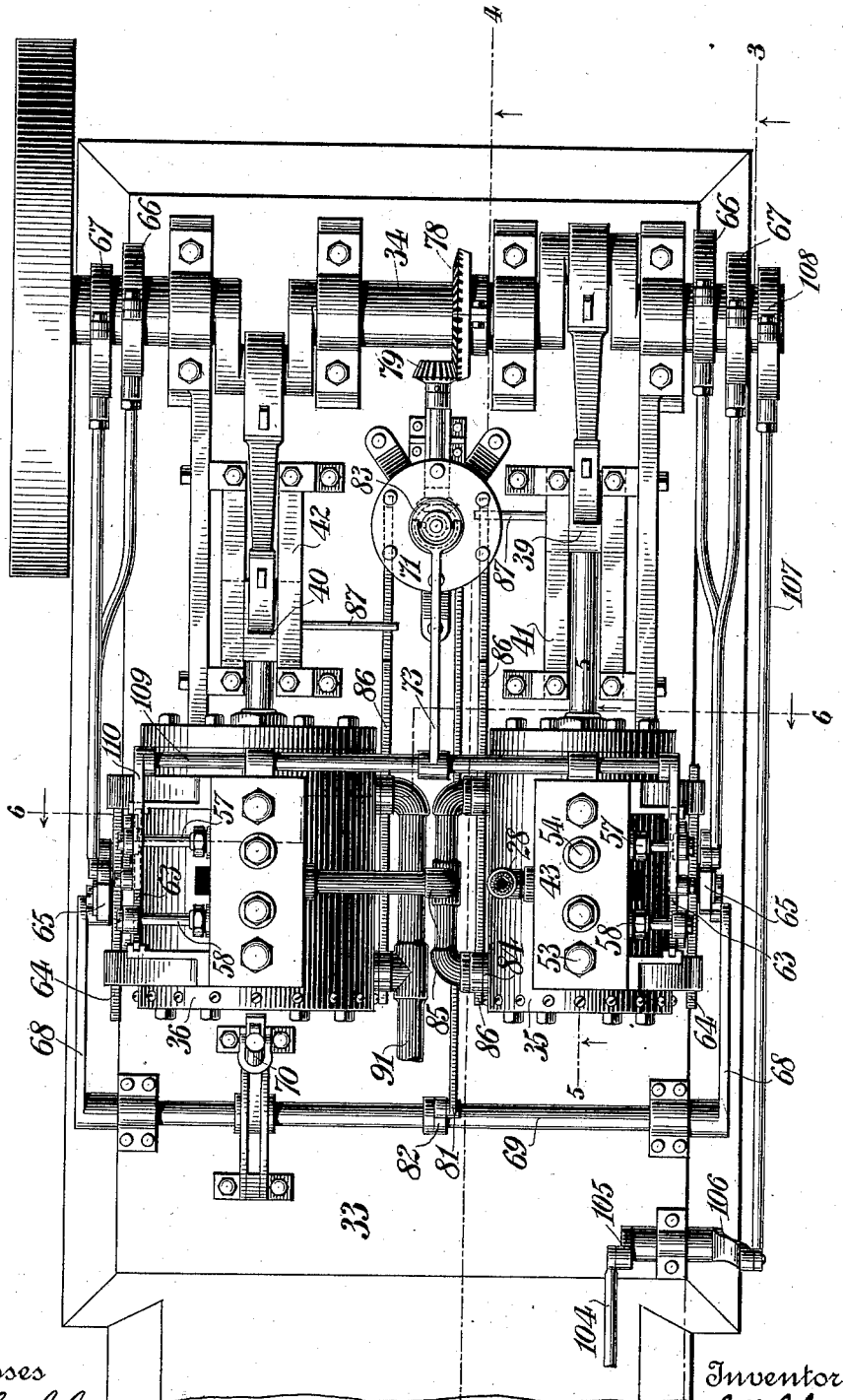
Figure 3:
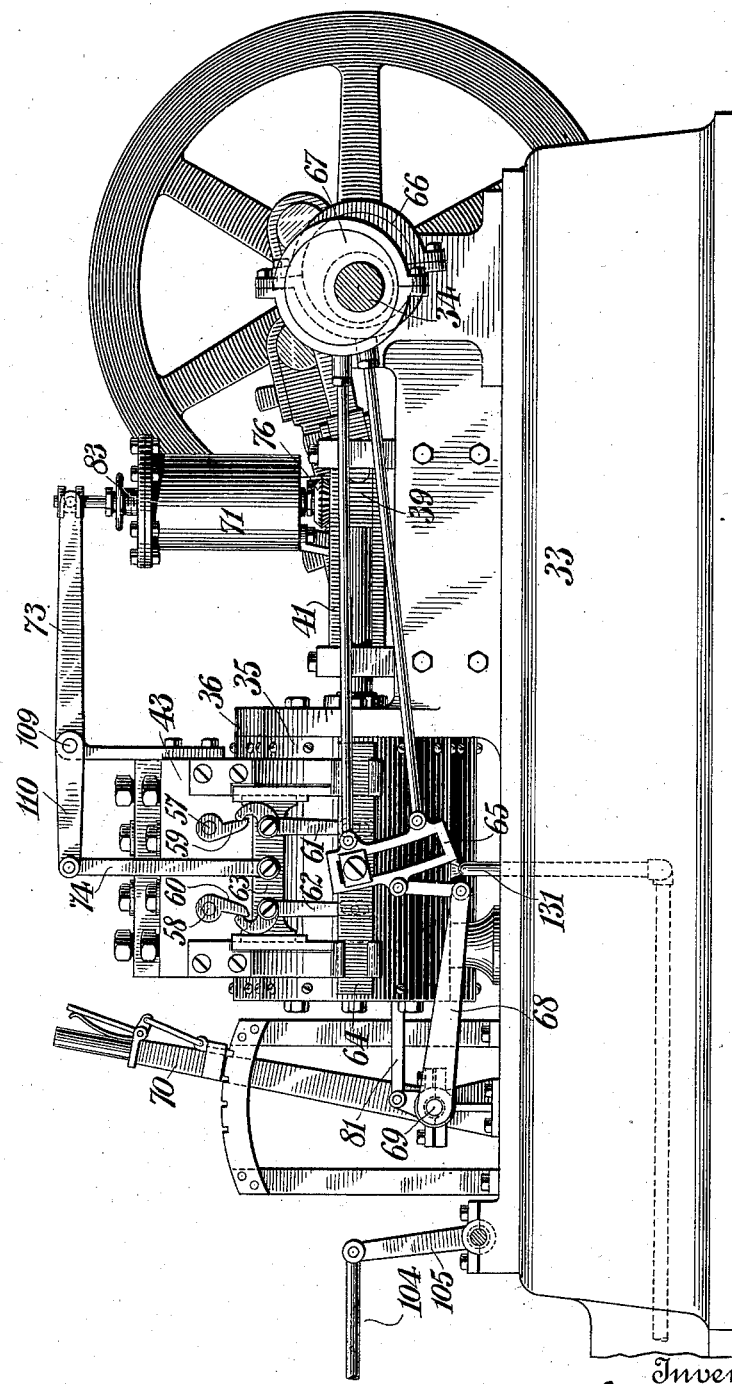

Figure 1, Sheet 1, is a side elevation of the complete organization. Fig. 2, Sheet 2, is a plan view of motor or engine on an enlarged scale. Fig. 3, Sheet 3, is a side elevation of the same with the outside eccentric and its rod removed, as indicated by lines 3, 3, Fig. 2. Fig. 4, Sheet 4, is a vertical section of Fig. 2, taken on line 4, 4, showing more clearly the governing mechanism of the engine. Fig. 5, Sheet 5, is a vertical section of the high pressure cylinder, on the line 5, 5, Figs. 2 and 6 on an enlarged scale. Fig. 6, Sheet 6, is a transverse section of Fig. 2, taken on the line 6, 6, showing the front end of the high pressure cylinder, and the second cylinder in section. Fig. 7, Sheet 7, is a view showing the gas compressing mechanism, in side elevation with the valve and chest of the cylinder in section taken on the line 7, 7, Fig. 9, and with the end of one of the pump cylinders broken away. Fig. 8, Sheet 8, is a horizontal sectional view of the gas compressing mechanism, on the line 8, 8, Figs. 7 and 9. Fig. 9, Sheet 6, is a transverse sectional view of Figs. 7 and 8 on the lines 9, 9. Fig. 10, Sheet 7, is an enlarged sectional elevation of the air and heating gas pressure regulators, taken on the line 10, 10, Fig. 1. Fig. 11, Sheet 5, is a horizontal section on line 11, 11, Fig. 5, on an enlarged scale, of one of the induction ports and valves of the engine. Fig. 12, Sheet 5, is an enlarged sectional view of the inlet valve of one of the gas compressing cylinders. Fig. 13, Sheet 5, is a transverse section of the same on the line 13, 13, Fig. 12. Figs. 14, 15, and 16 Sheet 9, illustrates a modification for operating the eduction valves of the engine. Fig. 14 is a side elevation of one of the cylinders showing the induction valve mechanism. Fig. 15 is a rear end view of the cylinder, and Fig. 16 is the reverse side of the cylinder showing the eduction valves.

The drums or reservoirs 17 and 18 contain the carbonic acid gas under a high pressure. They are connected together at their lower ends by means of a pipe provided with a valve or stop cock 19, by means of which communication may be made between them as desired. The gas is initially compressed to the point of liquidity and in this state passes from the reservoir 17, in commencing its cycle through the apparatus, its flow being regulated by the valve 20, and after performing its functions is, by the compressing mechanism, forced into the reservoir 18 through the pipe 21. The valve 20 is, by the pipe 22, connected to coil of small pipe 23 surrounding the compression cylinder 24. The other end of this coil is by means of the pipe 25 connected to the one end of the coil 26 which surrounds the other compression cylinder 27, and the pipe 28 connects the other end of this coil 26 to the valve chest of the first cylinder of the motor engine.

The compression cylinders 24 and 27 are respectively provided with jackets or casings 29 and 30, the spaces between said cylinders and casings being filled with water or brine, which is supplied to them by means of the pipes 31, 31, and may be withdrawn through cocks 32, 32, when desired. A tank, if desired, may be connected to the pipes 31, 31, and cocks 32, 32, in such a manner as to admit of the circulation of the water or brine, and said tank may be provided with coils or series of pipes for the carbonic acid to flow through, to assist in extracting heat from or imparting it to the water or brine. The casing 29 and 30, may be of a flexible nature, or made flexible by corrugations to prevent their joints being ruptured by the expansion of the water or brine.

I would here remark, to avoid repetition throughout this specification, that all of the parts and connecting pipes of the apparatus are preferably covered with some good heat non-conducting material. This applies to all of the jackets and casings as well as the pipes and parts of the apparatus through which the carbonic acid flows.

I will now describe the motor engine as this is next in sequence in the circuit of the flow of the carbonic acid. All of the parts of this engine are mounted on the main bed-frame 33, and it comprises the double crank shaft 34, fitted to rotate in suitable bearings at one end of the bed-frame 33, the high and low pressure cylinders 35 and 36, their pistons 37 and 38, their piston-rods and connecting rods, and their cross-heads 39 and 40 fitted to slide in guide ways 41 and 42 all of which are constructed in the ordinary manner.

Referring to Fig. 5, it is seen that the valve chest 43, is secured to the top of the cylinder 35, by means of the stud bolts 44, 44, and that the carbonic acid enters said chest from the pipe 28, through the orifice 45. On the bottom of the valve chest are formed or secured the two nipples 46 and 47, which project upwardly therefrom and are provided with three radial ribs on their exterior, over which are fitted the cylindrical finely punctured screens 48, 48, as clearly shown in Fig. 11. These nipples have a fine hole formed through their upper ends, which communicate with the induction openings 49 and 50 of the cylinder through the passages 51 and 52. A part of these passages are formed by longitudinal and transverse borings in the chest retaining studs 44 and 44. The other parts may be cored or bored in the cylinder and valve chest. The cap nuts 53, 53 screwed on the upper ends of the stud bolts 44, 44 hold the valve chest in position. Immediately over the valve nipples 46 and 46, are openings in the top of the chest, These openings are closed by means of the screw plugs 54, 54, and are longitudinally bored to receive and guide the upper stems of the puppet valves 55 and 56. The lower enlarged parts of these valves are bored and fitted to embrace and slide freely over the screens 48, 48 and in their hollow ends are placed a suitable metallic or other packing adapted to perfectly close the openings of the nipples when their puppets are allowed to rest on them. The puppet 55 is shown as closing its valve, the front end of the cylinder now exhausting, and the puppet 56 is shown in open position, thus allowing the carbonic acid to pass through the screen 48, up the sides of the nipple between the radial ribs and to the cylinder through the nipple 47, and the passage 52. These puppet valves 55 and 56 are raised and dropped at the right time by means of bars 57 and 58 fitted to oscillate transversely in the valve chamber, said bars being provided with tappets arranged to act against the under sides of notches formed in the sides of the body of the puppet valves 55, and 56, as clearly shown in Fig. 5. These bars 57 and 58 pass through stuffing boxes in the side wall of the chest 43, and to their ends are secured the short arms or levers 59 and 60, respectively, the outer sides of which are acted upon by the short arms of the levers 61 and 62, which are pivoted on the piece 63, fitted to slide vertically in a frame attached to the side of the cylinder. The lower end of the levers 61 and 62 are controlled by the horizontally sliding bar 64, which carries the center stud or block of the link 65, to which is attached the rods of the two eccentrics 66, 67. The link 65 is at its central part carried by the arm 68 secured to the shaft 69 of the reversing lever 70. This link motion and reversing gear are of the ordinary construction and may be replaced by any suitable mechanism to impart rocking motion to the levers 61 and 62 from the main shaft of the engine.

The object of carrying the levers 61 and 62 on a vertically sliding piece is to cause a change in their leverage of action on the arms 59 and 60 by the levers 61 and 62, and thereby vary the times the valves are kept open to admit the carbonic acid to the cylinder. This is controlled by means of an automatic governor, consisting of a cylindrical vessel 71 adapted to contain oil or other suitable fluid and in which is fitted to rotate a vertical shaft provided with a screw propeller 72, and extending through both the top and bottom of the vessel 71. The upper end of this shaft is by a suitable fork connection joined to the end of the lever 73, on the shaft 109 which is held in brackets projecting from the cylinders, and by means of a link 74 the arm 110 is connected to the sliding piece 63.

On the lower end of the propeller shaft of the governor are two miter-wheels 75 and 76 which are so connected to the shafts, by means of a spline or otherwise, that they are free to slide longitudinally thereon, but cause it to rotate with them. Between these miter-wheels 75 and 76 is another wheel 77 on a short horizontal shaft, so located that either of the wheels 75 and 76 may be put in gear therewith. Motion is imparted to the wheel 77 from the main shaft by means of the bevel wheel and pinion 78 and 79, and so rotary motion is imparted to the screw propeller 72 through the miter-wheel in mesh with the wheel 77. The two wheels 75 and 76 are supported and controlled by the horizontal arm of the bell crank lever 80, the vertical arm of which is, by means of the rod 81, connected to the arm 82 secured to the shaft 69 of the reversing lever. The object of this reversing system of wheels 75, 76 and 77 is to provide a means for imparting motion to the propeller governor always in one and the same direction, irrespective of the direction of rotation of the main shaft of the engine, for it will be observed that when the reversing lever 70 is moved over into the opposite position to that shown in the drawings, thereby then causing a change in the direction of rotation of the main shaft and also in the wheel 77, the lower miter-wheel 75, is moved out of gear and the miter-wheel 76 thrown into gear with the wheel 77 so that the shaft of the propeller is caused always to maintain its direction of rotation, by which the screw propeller 72 has an ascending tendency in the fluid contained in the vessel 71—thus as its speed increases above the normal the spring on the propeller shaft is compressed, the outer end of the lever 73 raised and its inner end with the sliding piece 63 depressed. This lowering of the piece 63 causes the ends of the levers 61, 62 to act on the arms 59 and 60, at a greater distance from the center of the bars 57 and 58 and so rock the bars a correspondingly less distance, thereby reducing the time the cylinder valves are kept open. The reverse action of course takes place when the engine decreases in speed.

Through the top of the governor vessel 71 and surrounding the shaft of the propeller 72 is a screw 83, between the end of which and the collar on the shaft is placed the controlling and regulating spring, the tension of which is quickly and accurately adjusted by means of the screw 83. The eduction ports 84, 84, of the cylinder 35 open by passages into the pipe 85, and in said passages are fitted slide valves forming a part of or actuated by the bar 86. This bar is, at the end of each stroke of the piston operated so as to suddenly alternately open and close the two eduction ports. This may be accomplished in various ways. The plan shown in the main views of the drawings, consists in extending this bar 86 forward, so as to lie alongside of the guides of the cross head, and providing it with two upturned projections, the distance or space between which is somewhat less than the throw of the engine, and in providing the cross-head 39 with a pin 87 arranged to play between and act against the projections on the bar 86, and thereby actuate the eduction valves in proper time to allow the cylinder to exhaust.

Another method of operating the eduction valves of the motor cylinders, and one which I prefer to use when the engine is required to be reversible is shown at Figs. 14, 15 and 16. This consists in connecting the slide bar 86 of the eduction valves to the horizontally sliding bar 64 of the induction valve mechanism through the medium of the rock levers 88 and 89 secured to the rock-shaft 90 which fits into bearings on the bed-frame 33, beneath the cylinder. A fork at the end of the lever 88 embraces a pin on the bar 64, and a similar fork at the end of the lever 89 embraces a pin on the bar 86, so that the two bars move simultaneously together and all of the valves are actuated by the eccentrics.

The attending mechanism and devices of the low pressure cylinder 36 are in all essential features similar to and operate the same as those already described belonging to the high pressure cylinder 35, so it is unnecessary to repeat what has been said to describe them; the corresponding parts being marked by similar letters of reference, the foregoing description will fairly apply thereto. It is necessary to state however that the pipe 85 from the eduction ports of the cylinder 35 enter the valve chest of the cylinder 36 so that the initial pressure of the carbonic acid in the low pressure cylinder is that of its final pressure in the high pressure cylinder. After a further expansion of the carbonic acid in performing work in the cylinder 36 it passes from its eduction ports by the pipe 91, to the valve chest 92 of the power cylinder 93 of the gas compressing engine. The final pressure of the carbonic acid in the low pressure cylinder 36 being its initial pressure in the cylinder 93.

The valve chest 92 is secured to the side of the cylinder 93 in the ordinary manner, but has the ports formed in its two opposite sides instead of being formed in a valve-seat on the cylinder as ordinarily; and the valve fits and slides between these walls of the chest, and is not in contact with the side of the cylinder. There are three ports in each of the walls of the chest opposite one another, the central ports 94, 94 being the eduction or exhaust and the outside ports the induction ports; the passages from the ports 95, 95 at one end of the chest pass down into the wall of the cylinder and connect together in the passage 96 which extends to the opening 97 in the corresponding end of the cylinder. The other ports 98, 98 connect with the passage 99 and so with the opening 100 at the other end of the cylinder.

The slide valve is composed of the yoke 101, in which are fitted the two blocks 102, and 103, so as to move with the yoke without any longitudinal play, but free to move vertically therein, the outer faces of the blocks constituting the working faces of the slide valve. Both of the blocks 102, and 103, have a vertical central hole formed through them, and the upper one is reduced in size at its lower part and fits into a recess formed in the lower one, a rubber or other suitable spring or packing being placed between the adjacent shoulders of these blocks to keep their working faces in contact with the valve-seats in the chest 92. The central openings in these blocks 102 and 103 form a communication between the eduction ports 94, 94, so that the pressure of the exhaust gas bears equally on both sides of the valve, and as the gas under its initial pressure always surrounds the valve in the chest, and passes through ports equally on both sides of the valve, the valve is practically under a perfect balance and moves with the least amount of resistance and at the same time maintains a close contact with faces of the valve seat.

The valve yoke 101 is provided with a stem which passes through a packing box at the end of the chest and to this stem is fastened one end of the rod 104, the other end of which is pivoted to the rocking arm 105. This arm 105 is connected or forms part of the arm 106 and they rock in a bearing on the bed frame 33; the arm 106 receiving motion from the main shaft 34 of the motor engine, by the connecting rod 107 of the eccentric 108. The valve of the compressing engine is thus caused to work in unison with the motor engine.

The cylinder 93, as well as the compression cylinders 24, 27 are supported by suitable frames 111, standing up from the bed frame 33. The cylinder 93, as well as its piston, 112, are of ordinary construction; the piston rod 113 extends through both of the cylinder heads and carries the plungers 114 and 115 of the compression cylinders 24 and 27 respectively. After the carbonic acid has expended its energy in the cylinder 93 it passes out through the eduction ports 94, 94 and by the passage 116 and pipes 117 and 118, enters the coils of pipe 119 and 120 in the water or brine chambers of the compression cylinders 24 and 27, and from said coils, after being somewhat condensed by the cooling action of the water or brine it passes by the branch pipes 121, and 122, to the inlet valves of the cylinders 24 and 27 respectively. One of these inlet valves is shown on an enlarged scale at Figs. 12 and 13, Sheet 5, the same consisting of a tubular body 123 with a partially closed top in which is formed the valve seat, and a valve 124 having a straight shank to fit into a perforated guide partition 125, in the interior of the body 123, and a conical head to fit into the valve seat. The body near the central part is provided with a collar and above this collar is screw threaded, and by means of which the valve body is screwed into a bush secured to the lower side near the end of the compression cylinder, as clearly shown at the left hand end of Fig. 7. The discharge valves are similarly constructed with the exception of the valve seats being formed inside the body instead of outside, as shown, said discharge valves are placed on the upper sides of the cylinders. The pipes 126 and 127 join the outlet valve bodies to the pipe 21, and so place the compression cylinders 24 and 27 in communication with the reservoir 18, into which reservoir the carbonic acid is forced after being compressed in the cylinders 24 and 27.

All of the cylinders 35, 36 and 93 in which the expansive force of the carbonic acid is utilized to produce power are provided with jackets or casings, indicated respectively by the numbers 128, 129, and 130. These casings are perforated at the bottoms for the admission of gas flames to the annular spaces between them and the cylinders and have openings at their upper parts for the escape of the products of combustion. The gas burners 131, 132 and 133 are in the branch pipes located under the bed-frame, extending from the main supply pipe 134. The supply of gas may be from any source, it may be under considerable pressure and also mixed with air under pressure.

An apparatus suitable for supplying gas and air to the burners is shown Fig. 1. It consists of two closed tanks 135 and 136 with pipe connections by which gas may be forced into tank 135 under pressure and air forced into tank 136, and pipe connections 137 and 138 by which the gas and air are allowed to pass from the respective tanks to the supply pipe 134 through the mixing chamber 139. In each of these pipe connections 137, 138 is placed a pressure gage and a pressure reducing device 140, by means of which the supply of gas and air may be regulated and their pressure in the supply pipe 135 maintained constant irrespective of the variations of pressure in the tanks 135 and 136. An enlarged view of one of these pressure regulators is shown at Fig. 10, Sheet 7, in which 141 represents a flexible diaphragm arranged across the interior of the body 140, 142 a valve acting against a valve seat located beneath the diaphragm, 143 a spring resting on the diaphragm and 144 an adjusting device by means of which the pressure of the spring may be varied to accord with the working pressure desired. The valve 142 is attached to and actuated by the diaphragm 141, which instantly responds to any variations of pressure for which the spring 143 is set.

It is obvious that by the application of ordinary mechanical skill changes and modifications may be made in the apparatus herein described without departing from the principles involved in my invention, as for instance a part of the power of the motive power engine may be used to operate the condensing pumps instead of using a separate cylinder therefor: Or separate engines as shown may be connected to the compressed gas supply to have the gas divided between in any desired proportions instead of passing from one to the other; also that the gas pipes from the compressed gas supply reservoir may be arranged to allow the gas to pass simultaneously to the heat absorbing fluid chamber instead of passing through them in series, and that the cycle of operation may be conducted through any desired range of pressure of the carbonic acid; and also that many of the devices shown may be used in other organizations.

Having now described my invention, what I claim, and desire to secure by Letters Patent, is—

1. In a closed circuit gas engine, in combination a compressed gas holder or reservoir, a compressing pump, a heat absorbing fluid chamber surrounding the pump, a coil of pipe from the gas reservoir located in this chamber, a motor engine connected to this coil, another power cylinder connected to the exhaust of the motor engine and arranged to operate the compressing pump, a heating apparatus for imparting heat to the cylinders of the motor engine, and the power cylinder, a coil of pipe located in the heat absorbing fluid chamber and connected to the exhaust of the pump cylinder, and a compressed gas holder or reservoir connected to this coil of pipe and also connected to the other gas reservoir by a stop valve connection.

2. In a closed circuit gas engine, in combination a compressed gas reservoir, a chamber holding a heat absorbing medium, two passages therein having heat radiating surfaces, a motor engine connected to the gas reservoir by one of the passages a source of heat supply, and a gas compressing pump connected at its inlet to the exhaust of the motor engine, and at its outlet to the gas reservoir by the other passage.

3. In a gas engine, in combination, the cylinder, the valve chest, puppet valves communicating with the ends of the cylinder, arms or tappets on the puppet valves actuating rods, levers pivoted to a frame on the side of the cylinder with their upper ends in juxtaposition to the arms or tappets, a horizontally sliding bar attached to and controlling the lower ends of the levers, and means for reciprocating said sliding bar.

4. In a gas engine, in combination, arms on rock shafts for actuating the valves, a vertically sliding frame, levers pivoted to the vertically sliding frame arranged with their upper ends in juxtaposition to the arms, a fluid governor driven from the main shaft and having a vertically moving spindle, a lever connecting said spindle of the governor to the vertically sliding frame, and a bar and means for reciprocating it horizontally, said bar being attached to and controlling the lower ends of the levers, which are pivoted to the vertically sliding frame, substantially as and for the purpose set forth.

5. In a gas engine valve gear, in combination a bar fitted in slides to move horizontally, a starting and reversing device comprising a link connected to the bar and operated by two eccentrics on the main shaft and a hand lever connected to the link, two levers pivoted to a frame on the side of the cylinder having their lower ends controlled by the horizontally moving bar, arms or tappets on rocking rods arranged to be acted upon by the upper ends of the levers, and puppet valves operated by the rocking rods to which the arms are attached, substantially as and for the purpose set forth.

6. In a gas engine valve gear, in combination, a bar fitted to slide horizontally, a reversing gear operated from the main shaft, the link of which is connected to and actuates the bar, two levers pivoted on a frame fitted to slide vertically, arms on the valve actuating shafts arranged to be acted upon by the upper ends of the levers, and a governing device operated from the main shaft and connected to the vertically sliding frame, substantially as and for the purpose set forth.

7. In a gas engine, in combination, a reversing valve controlling gear, a fluid governor having a rotating propeller, a gear wheel driven from the main shaft, reversing gear wheels fitted to rotate the propeller shaft, and means connected to the reversing gear for setting said reversing gear wheels so that the governor propeller is caused to rotate always in the same direction.

8. In a gas engine, in combination, the cylinder valves and means for operating the same from the main-shaft a hand lever for reversing the direction of rotation of the main shaft, a fluid governor having a rotating propeller, a bevel wheel in a vertical plane on a shaft driven by connecting gear wheels from the main shaft, two connected bevel wheels on the governor propeller shaft adapted to be alternately moved into gear with the vertical bevel wheel, a bell crank lever arranged to control the two connected bevel wheels, and a rod connecting the bell crank lever to the shaft of the hand lever of the reversing gear, substantially as and for the purpose set forth.

9. In a gas engine in combination, the cylinder, induction valves, a bar fitted to slide horizontally in guides on the side of the cylinder and reciprocated by suitable means from the main shaft, levers and tappets for imparting motion from this bar to the induction valves, eduction valves and a horizontally sliding bar for actuating them on the other side of the cylinder, a rock shaft fitted in bearings transversely to the cylinder, and levers or arms fastened to the ends of the rock shaft and connected to the two horizontally sliding bars, substantially as and for the purpose set forth.

10. In a gas engine, in combination, a valve consisting of a nipple having exterior vertical ribs extending into the valve chest and constituting a continuation of a cylinder induction passage, a cylindrical screen fitting on the ribs of the nipple, a rod or bar having a cylindrical recess at its lower end so as to embrace the cylindrical screen but be free to slide vertically thereon, and means for raising the rod or bar, substantially as and for the purpose set forth.

11. In a gas engine, in combination a nipple valve, a rod or bar recessed at one end to cover the nipple and having a valve seat formed in the recess, and a screen interposed between the valve face of the nipple and the opening of the recess of the rod.

12. In a gas engine, in combination, a valve chest, a nipple valve extending therein, a rod or bar recessed at one end to cover the nipple valve, a guide or bearing formed in the wall of the valve chest opposite the nipple valve and in which the other end of the rod or bar is fitted to slide, and a screen interposed between the valve face of the nipple and the opening of the recess of the rod.

13. In a gas engine, in combination, a valve chest, a nipple valve extending therein, a screen surrounding the nipple, a rod recessed at one end to fit over and slide on the screen and having a valve seat at the bottom of the recess, a bearing in or on the wall of the chest opposite the nipple valve and forming a guide for the other end of the rod, a tappet rod extending through a side wall of the chest, arranged at right angles to and acting on the recessed rod, and means for rocking the tappet rod.

14. In a gas engine, in combination, a cylinder, a valve chest, studs secured in the side of the cylinder and passing through the walls of the valve chest, cap nuts on the outer ends of the studs, nipple valves in the valve chest, ports in the interior of the cylinder, and passages extending from the nipple valves laterally into the studs and vertically through the ends of the studs to the cylinder ports.

15. In a gas engine, in combination, a gas compressing cylinder and its plunger, a jacketed space surrounding the cylinder adapted to hold a heat absorbing fluid, a coil of pipe located in the heat absorbing fluid, a connecting pipe joining one end of said coil to the inlet valve of the cylinder, and a gas reservoir connected to the other end of the coil substantially as and for the purpose set forth.

16. In a gas engine, in combination, a compressed gas reservoir, a power cylinder and its piston, gas compressing plungers and their cylinders, said plungers being operated directly by the power piston, jacketed space surrounding the compressing cylinders and adapted to hold heat absorbing fluid, two coils of pipes around the cylinders within the jacketed space, and connecting pipes between the gas reservoir, the power and compressing cylinders and the coils of pipes, substantially as and for the purpose set forth.

17. The slide valve of a gas engine, consisting of the following elements in combination, two blocks having central vertical holes, the upper face of one and the under face of the other constituting the working of the valve, the central parts being fitted together to permit of vertical play only between them, an elastic washer located between adjacent shoulders of the blocks, and a yoke surrounding the blocks and provided with a rod by means of which the valve is connected to the actuating mechanism.

18. In a gas engine, in combination, a cylinder, a valve chest having two induction ports formed in each of its side walls opposite to one another, each opposing pair of ports being connected by passages to the openings in the ends of the cylinder, and an eduction in each of its side walls located between the induction ports and connected by passages to the exhaust passage of the cylinder, and a slide valve having a central passage through it and fitted to bear against the two side walls of the chest, substantially as and for the purpose set forth.

19. In combination a valve chest, a two part slide valve located therein with space on four sides, the inlet pipe being in one of the walls of the chest thus allowing the working gas to act by its pressure on four sides of the valve, the two other sides of the valve being held against two opposing side walls constituting the valve seats of the chest, two pair of connected ports in said walls connected respectively to the end ports of the cylinder and so arranged as to be alternately covered by the valve, and means for reciprocating the valve.

20. In a gas engine, in combination, a cylinder, a valve chest having two induction ports formed in each of its side walls opposite to one another, each opposing pair of ports being connected by passages to the openings in the ends of the cylinder, and an eduction in each of its side walls located between the induction ports and connected by passages to the exhaust passage of the cylinder, and a slide valve consisting of two blocks having central vertical holes, the upper face of one and the under face of the other constituting the working faces of the valve, the central parts being fitted together to permit of vertical play only between them, an elastic washer located between adjacent shoulders of the blocks, and a yoke surrounding the blocks and provided with a rod by means of which the valve is connected to the actuating mechanism.

In testimony whereof I have hereunto subscribed my name.

GEORGE H. CHAPPELL.

Witnesses:
FRANK S. OBER,
M. J. KELLEY.